United States Patent [19]

Toya

[11] Patent Number: 5,021,494
[45] Date of Patent: Jun. 4, 1991

[54] THERMAL CONDUCTIVE SILICONE COMPOSITION

[75] Inventor: Masanori Toya, Gunma, Japan

[73] Assignee: Toshiba Silicone Co., Ltd, Tokyo, Japan

[21] Appl. No.: 416,752

[22] Filed: Oct. 3, 1989

[30] Foreign Application Priority Data

Oct. 3, 1988 [JP] Japan ................. 63-249607

[51] Int. Cl.$^5$ ................................. C08K 3/38
[52] U.S. Cl. ................... 524/404; 524/413; 524/424; 524/430; 524/431; 524/433; 524/437; 524/440; 524/441; 524/780; 524/781; 524/783; 524/785; 524/786; 524/787; 524/779
[58] Field of Search ............... 524/780, 781, 783, 785, 524/786, 787, 779, 404, 413, 424, 430, 431, 433, 437, 440, 441

[56] References Cited

U.S. PATENT DOCUMENTS 4,444,944  4/1984  Matsushita ........................ 524/786
4,604,424  8/1986  Cole et al. ........................ 524/433
4,946,893  8/1990  Saito et al. ........................ 524/785

Primary Examiner—Melvyn I. Marquis
Attorney, Agent, or Firm—Sughrue, Mion, Zinn, Macpeak & Seas

[57] ABSTRACT

A thermally conductive silicone composition comprising:
(A) 100 parts by weight of a polyorganosiloxane containing at least two silicon-bonded alkenyl groups per molecule and having a viscosity as measured at 25° C. of 10 to 100,000 cP;
(B) a polyorganohydrogensiloxane containing at least three silicon-bonded hydrogen atoms per molecule in an amount such that the number of silicon-bonded hydrogen atoms contained therein is 0.5 to 4.0 per alkenyl group contained in component (A);
(C) a catalyst selected from the group consisting of platinum and platinum compounds, in an amount of 0.1 to 100 ppm by weight, in terms of the amount of platinum atoms, based on the amount of component (A);
(D) 100 to 800 parts by weight of a heat transfer filler having an average particle diameter of 5 to 20 μm and having a particle size distribution such that particles having a particle diameter of 5 μm or less are 20% or more of the whole particles and particles having a particle diameter of 10 μm or more are 20% or more of the whole particles; and
(E) 0 to 20 parts by weight of an adhesion promoter.

12 Claims, No Drawings

THERMAL CONDUCTIVE SILICONE COMPOSITION

FIELD OF THE INVENTION

This invention relates to a thermally conductive silicone composition. More particularly, it is concerned with a thermally conductive silicone composition useful as a heat-dissipating potting or adhesive composition for electrical or electronic parts or other materials.

BACKGROUND OF THE INVENTION

For the purpose of preventing the overheating of semiconductor elements such as a power transistor, heat-dissipating greases or sheets having excellent thermal conductivity have conventionally been used between heat-dissipating fins and semiconductor elements.

The heat-dissipating greases are used in large amounts even today, because they can be easily applied on semiconductor elements without being affected by the shapes of the semiconductor elements. However, the heat-dissipating greases have problems that other parts are soiled with the greases and that when electrical or electronic products using such greases are used for a long period of time, the greases exude an oil.

The heat-dissipating sheets, on the other hand, are free from the above problems, i.e., the soiling of other parts and the exuding of an oil. However, the heat-dissipating sheets should be formed so as to fit to semiconductor elements, and they have a problem that they bend when fixed with screws or the like, resulting in poor heat-dissipating properties.

In order to overcome these problems, a method in which a liquid silicone rubber composition is used as a potting compound or an adhesive has been proposed as disclosed in, for example, JP-A-61-157569 (the term "JP-A" as used herein refers to a "published unexamined Japanese patent application"). This composition, however, is disadvantageous in that when the filler content is increased for the purpose of improving its heat-dissipating effect, the resulting composition has too high a viscosity, whereby not only can such a composition not be applied on semiconductors or heat-dissipating fins uniformly, but also air is introduced to impair the heat-dissipating properties.

SUMMARY OF THE INVENTION

Accordingly, an object of the present invention is to provide a thermally conductive silicone composition which has a high thermal conductivity and, despite this, shows a good workability because its viscosity is not so high, thereby eliminating the above-described problems.

As a result of intensive studies to develop such a composition, it has now been found that the thermal conductivity of a thermally conductive silicone composition can be increased without greatly increasing its viscosity by using heat transfer filler particles having specific particle diameters. The present invention has been completed based on this finding.

The thermally conductive silicone composition according to the present invention comprises (A) 100 parts by weight of a polyorganosiloxane containing at least two silicon-bonded alkenyl groups per molecule and having a viscosity as measured at 25° C. of 10 to 100,000 cP;

(B) a polyorganohydrogensiloxane containing at least three silicon-bonded hydrogen atoms per molecule in an amount such that the number of silicon-bonded hydrogen atoms contained therein is 0.5 to 4.0 per alkenyl group contained in component (A);

(C) a catalyst selected from the group consisting of platinum and platinum compounds in an amount of 0.1 to 100 ppm by weight, in terms of the amount of platinum atoms, based on the amount of component (A);

100 to 800 parts by weight of a thermally conductive filler having an average particle diameter of 5 to 20 $\mu$m and having a particle size distribution such that particles having a particle diameter of 5 $\mu$m or less are 20% or more of the whole particles and particles having a particle diameter of 10 $\mu$m or more are 20% or more of the whole particles; and (E) 0 to 10 parts by weight of an adhesion promotor.

DETAILED DESCRIPTION OF THE INVENTION

Component (A) contained in the thermally conductive silicone composition of this invention is a polyorganosiloxane containing at least two alkenyl groups per molecule, each of the alkenyl groups being directly bonded to a silicon atom. The polyorganosiloxane can be of a straight-chain or branched structure, or a mixture thereof. Examples of the alkenyl group include a vinyl group, an allyl group, a 1-butenyl group and a 1-hexenyl group. Of these, a vinyl group is most advantageous in that the synthesis of the polyorganosiloxane is easy. Examples of other silicon-bonded organic groups than alkenyl groups include alkyl groups (such as methyl, ethyl, propyl, butyl, hexyl and dodecyl), aryl groups (such as phenyl) and aralkyl groups (such as 2-phenylethyl and 2-phenylpropyl), and further include substituted hydrocarbon groups (such as chloromethyl and 3,3,3-trifluoropropyl). Of these, a methyl group is most preferred because of the easy synthesis of the polyorganosiloxane and because there can be obtained a polyorganosiloxane having a low viscosity before curing but having a degree of polymerization necessary for imparting good physical properties to a cured elastomer.

The silicon-bonded alkenyl groups contained in the polyorganosiloxane molecules may be present either at the ends or at other positions of the molecular chains or at both. However, it is preferred that at least one end of each molecule has an alkenyl group, in order to impart excellent mechanical properties to cured elastomers to be obtained from the thermally conductive silicone composition.

The polyorganosiloxane, component (A), has a viscosity as measured at 25° C. of from 10 to 100,000 cP, preferably from 50 to 10,000 cP. If the viscosity is too low, the filler in the composition separates out immediately. On the other hand, if the viscosity is too high, the resulting composition cannot have the necessary thermal conductivity because the amount of the heat transfer filler which can be added is necessarily limited.

The polyorganohydrogensiloxane, component (B), contained in the thermally conductive silicone composition of this invention should have at least three silicon-bonded hydrogen atoms per molecule so as to make the composition have a network structure through crosslinking. Examples of the other silicon-bonded organic groups are the same groups as in component (A). However, from the standpoint of the easy synthesis of the polyorganohydrogensiloxane, a methyl group is most preferred. Further, an alkenyl group may be present in component (B). The polyorganohydrogensiloxane may be of any of a straight-chain, branched and cyclic structure, or may be a mixture thereof.

The amount of component (B) added to the composition is such that the number of silicon-bonded hydrogen atoms contained in component (B) is from 0.5 to 4.0, preferably from 1.0 to 3.0, per alkenyl group contained in component (A). In the case where the amount is in the above range, the curing of the composition proceeds sufficiently, so that the hardness of the cured composition is increased and further the cured composition exhibits improved physical properties and heat resistance.

Component (C) contained in the thermally conductive silicone composition of this invention is a catalyst selected from the group consisting of platinum and platinum compounds, and serves to accelerate the addition reaction of alkenyl groups contained in component (A) with hydrosilyl groups contained in component (B). Examples of component (C) include platinum, chloroplatinic acid, a platinum-olefin complex, a platinum-alcohol complex and a platinum-coordinated compound. The amount of component (C) added to the composition is in the range of from 0.1 to 100 ppm by weight, in terms of the amount of platinum atoms, based on the amount of component (A). If the amount is less than 0.1 ppm, no catalytic effect is brought about. On the other hand, even if the amount is larger than 100 ppm, the curing of the resulting composition cannot particularly be accelerated any more.

Component (D) contained in the thermally conductive silicone composition of this invention is a filler which imparts thermal conductivity to the composition of this invention. Examples of such a filler include particles of a metal such as aluminum, copper or nickel; particles of a metal oxide such as alumina, magnesium oxide, beryllium oxide, chromium oxide or titanium oxide; and particles of a ceramic such as boron nitride, boron carbide, titanium carbide, silicon carbide or aluminum nitride. In the case where the composition is required to have electrical resistance, in particular, particles of a metal oxide or ceramic are preferred. Particularly, from the standpoint of a heat-dissipating effect, particles of alumina or silicon nitride are preferred.

One of the characteristic features of the present invention is that the heat transfer filler has an average particle diameter of from 5 to 20 $\mu$m. If the average particle diameter is less than 5 $\mu$m, the filler cannot be added in such an amount so as to impart the necessary heat-dissipating effect to the composition. If the average particle diameter exceeds 20 $\mu$m, such a filler cannot exhibit a sufficient reinforcing effect and further the resulting composition is poor in heat-dissipating effect.

Another characteristic feature of the present invention is that the distribution of the heat transfer filler particles is not a monodispersion but the filler has a specific, wide particle size distribution. That is, although the average particle diameter of the heat transfer filler is in the above-described range, the filler should be a mixture of relatively fine particles and relatively coarse particles, from the standpoint of easily increasing the filler content and thermal conductivity of the composition and easily maintaining the viscosity of the composition at a proper value. Specifically, the heat transfer filler should have a particle size distribution such that particles having a particle diameter of 5 $\mu$m or less are 20% or more of the whole particles and particles having a particle diameter of 10 $\mu$m or more are 20% or more of the whole particles.

In the case of an alumina filler, for example, particles having a wide particle size distribution with an average particle diameter of from 5 ,to 20 $\mu$m may be used or a combination of particles of which are a monodispersion having an average particle diameter of 5 $\mu$m or less and particles having an average particle diameter of 20 $\mu$m or more may be used.

The amount of component (D) added to the composition is from 100 to 800 parts, preferably from 300 to 750 parts, by weight per 100 parts by weight of component (A). If the amount is less than 100 parts by weight, the thermal conductivity of the composition becomes poor. If the amount of component (D) added exceeds 800 parts by weight, the flowability of the composition is impaired.

In the case where the thermally conductive silicone composition of this invention is used as a potting compound, the composition may consist essentially of the above-described components (A) to (D). However, in the case where the composition is used, for example, to bond and fix heat-generating elements to heat-dissipating fins, an adhesion promoter, component (E), is suitably added to the composition so as to impart adhesive properties thereto. Component (E) is an adhesion promoter for silicone rubbers which cure through addition reactions. Examples of such an adhesion promoter include those disclosed in, for example, JP-B-47-36255, JP-B-50-3460, JP-B-53-13508, JP-B-56-39783, JP-A-48-16952, JP-A-50-124953, JP-A-52-22051, JP-A-52-126455, JP-A-53-144960, JP-A-54-37157, JP-A-54-80358 and JP-A-54-91559 (the term "JP-B" as used herein refers to an "examined Japanese patent publication"). Preferred examples of the adhesion promoter are silane or siloxane derivatives having, in their molecules, functional groups such as the following groups:

(1) Si-H bond and epoxy group,
(2) Si-H bond and alkoxy group,
(3) vinyl group, epoxy group and alkoxy group,
(4) allyl group and alkoxy group,
(5) (meth)acryloxy group and alkoxy group.

Examples of compounds having such functional groups are described below, in which Me represents a methyl group.

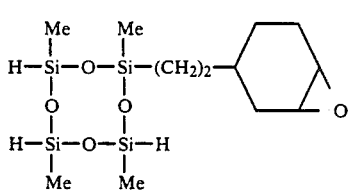
(I)

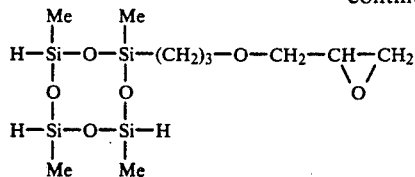 (II)

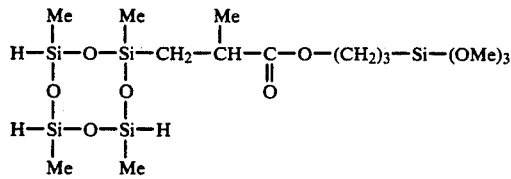 (III)

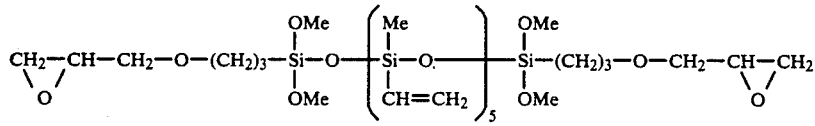 (IV)

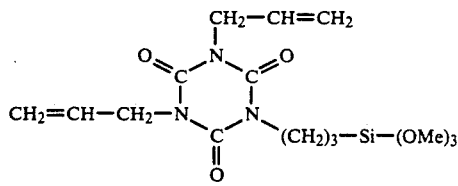 (V)

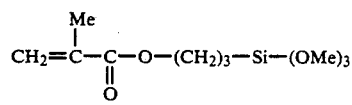 (VI)

Compound (VI) is used in combination with an organic peroxide.)

(Compound (VI) is used in combination with an organic peroxide.)

In the case where component (E) is used, the amount of component (E) added is from 0 to 10 parts by weight, preferably from 0.001 to 10 parts by weight, more preferably from 0.1 to 5 parts by weight, per 100 parts by weight of component (A). If the amount is too small, sufficient adhesive properties cannot be imparted to the composition, while too large an amount adversely affects the properties of cured elastomers obtained from the composition.

If desired and necessary, the composition of this invention may further contain a reinforcing filler other than the above-described components (A) to (E). Examples of the reinforcing filler include fumed silica, hydrophobic precipitated silica, molten silica, finely crushed quartz, diatomaceous earth, molten talc, talc, glass fibers, graphite, carbon and pigments. It is not preferred to add this filler in a relatively large amount because the increase in the viscosity of the composition due to the addition of the heat transfer filler, component (D), is large. Therefore, the amount of the reinforcing filler added is generally 30 parts by weight or less per 100 parts by weight of component (A).

The thermally conductive silicone composition of the present invention can be obtained by mixing the abovedescribed components (A) to (D) or components (A) to (E). However, since a mixture of components (A), (B) and (C) reacts to cure even at ordinary temperatures, it is necessary that any one of components (A), (B) and (C) is kept separately from the other components and the component is mixed with a mixture of the other components just before use. Alternatively, the curing reaction may be prevented by adding a conventional stabilizer to the thermally conductive silicone composition containing components (A), (B) and (C).

The thus-obtained thermally conductive silicone composition of this invention is used, for example, in the heat dissipation bonding of a ceramic substrate for a regulator, an igniter or the like with a heat-dissipating fin, the heat dissipation bonding of a power transistor with a heat-dissipating fin, and the heat dissipation bonding of a printer dot heat with a heat-dissipating fin.

As described hereinabove, the thermally conductive silicone composition of this invention has a high thermal conductivity and, hence, can efficiently transmit heat from heat generators to heat-dissipating fins or the like. The composition is also very effective to treat the increase in the amount of heat generated by, for example, integrated semiconductors of high power.

Further, the thermally conductive silicone composition having adhesive properties according to the present invention is useful in the miniaturization of electrical or electronic parts, without the necessity of the use of screws or the like. Particularly, the composition is advantageously applied to electrical or electronic parts for use in automobiles.

The present invention will be explained in more detail by reference to the following Examples, which should not be construed to be limiting the scope of the invention. In the Examples, all parts and percents are by weight unless otherwise indicated.

EXAMPLES

The following ingredients were provided for the preparation of compositions according to this invention and comparative compositions.

Component (A)

A-1: Polydimethylsiloxane in which both ends of the molecule had been blocked with a dimethylvinylsilyl group and which had a viscosity as measured at 25° C. of 1,000 cP.

A-2: Polydimethylsiloxane in which both ends of the molecule had been blocked with a dimethylvinylsilyl group and which had a viscosity as measured at 25° C. of 350 cP.

Component (B)

B-1: Polyorganohydrogensiloxane represented by $Me_3SiO(Me_2SiO)_{10}(MeSiO)_8SiMe_3$.

Component (C)

C-1: Chloroplatinic acid solution in octanol having a concentration of 2% in terms of the amount of platinum atoms.

Component (D)

D-1: Monodisperse alumina particles having an average particle diameter of 3.5 μm, with the amount of particles having a particle diameter of from 2 to 8 μm being 85%.

D-2: Monodisperse alumina particles having an average particle diameter of 25 μm, with the amount of particles having a particle diameter of from 10 to 50 μm being 90%.

D-3: Alumina particles having an average particle diameter of 15 μm and a wide particle size distribution such that the amount of particles having a particle diameter of 5 μm or less is 35% and the amount of particles having a particle diameter of 10 μm or more is 35%.

D-4: Alumina particles having an average particle diameter of 10 μm and a wide particle size distribution such that the amount of particles having a particle diameter of 5 μm or less is 40% and the amount of particles having a particle diameter of 10 μm or more is 30%.

Component (E)

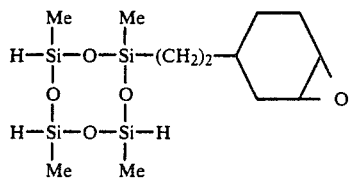

E-1

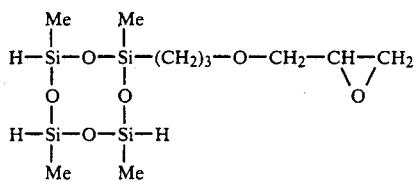

E-2

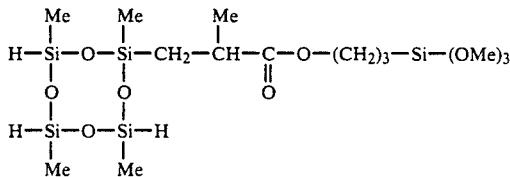

E-3

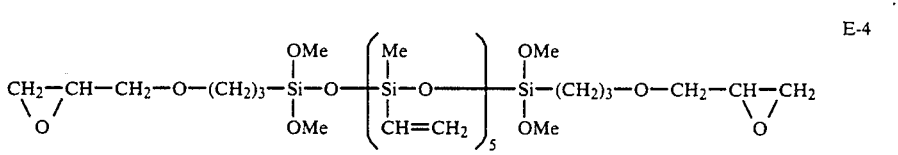

E-4

Each of compositions according to the present invention and comparative compositions was obtained by mixing the above components (A) to (E) as follows. That is, component (A) was introduced into a vessel and component (D) was added thereto in an amount shown in the Table below. The resulting mixture was gradually heated to 150° C. and then kneaded at that temperature for 1 hour. Subsequently, the resulting mixture was kept heated under a reduced pressure of 30 mmHg or less. The thus-obtained blend was cooled to room temperature, thereby preparing a base compound. Thereto were added components (B), (C) and (E) in amounts shown in the Table below, and the resulting mixture was kneaded to obtain a uniform composition.

The thus-obtained compositions were evaluated for the following properties.

(1) Viscosity

Measured at 25° C. with a rotational viscometer.

(2) Thermal Conductivity

Each of the compositions was formed into a 2 mm thick sheet and then heated at 150° C for 1 hour to give a rubber-like elastomer. Thereafter, it was cooled to 25° C., and its heat conductivity was measured with a rapid thermal conductivity meter, Shotherm QTM-DII manufactured by Showa Denko K.K., Japan.

(3) Shear Bonding Strength

In accordance with JIS C-2107, two Al plates and two polyphenylene sulfide (PPS) plates were bonded using each of the compositions as an adhesive, and the thus-obtained test pieces, each having an adhesive layer thickness of 1 mm, were evaluated for shear bonding strength The results obtained are shown in Table 1.

TABLE

|  | Present Invention | | | | Comparative Composition | |
| --- | --- | --- | --- | --- | --- | --- |
|  | 1 | 2 | 3 | 4 | 5 | 6 |
| A-1 (part) | 100 |  | 100 | 100 | 100 |  |
| A-2 (part) |  | 100 |  |  |  | 100 |
| B-1 (part) | 1 | 1 | 1 | 1 | 1 | 1 |
| —SiH/—SiVi | 1.6 | 2.3 | 1.6 | 1.6 | 1.6 | 2.3 |
| C-1 (part) | 2 | 2 | 2 | 2 | 2 | 2 |
| D-1 (part) |  |  |  | 200 | 500 |  |
| D-2 (part) |  |  |  | 300 |  | 600 |
| D-3 (part) | 400 | 600 |  |  |  |  |
| D-4 (part) |  |  | 600 |  |  |  |
| E-1 (part) | 2 |  |  | 2 | 2 |  |
| E-2 (part) |  | 1 |  |  |  | 1 |
| E-3 (part) |  |  | 1 |  |  |  |
| E-4 (part) |  | 1 | 1 |  |  | 1 |
| Appearance | ←White, flowable→ | | | | White, unflowable | |
| Viscosity (25° C., cP) | 10,000 | 30,000 | 55,000 | 15,000 | 1,000,000 | Measurement impossible |
| Thermal Conductivity (cal/cm · s · °C.) | $3.5 \times 10^{-3}$ | $4.2 \times 10^{-3}$ | $4.1 \times 10^{-3}$ | $3.8 \times 10^{-3}$ | $3.6 \times 10^{-3}$ | $3.8 \times 10^{-3}$ |
| Shear Bonding Strength (kg · f/cm$^2$) | | | | | | |
| Al/Al | 19 | 18 | 18 | 19 | 17 | 8 |
| PPS/PPS | 14 | 13 | 13 | 14 | 10 | 5 |

While the invention has been described in detail and with reference to specific embodiments thereof, it will be apparent to one skilled in the art that various changes and modifications can be made therein without departing from the spirit and scope thereof.

What is claimed is:

1. A thermally conductive silicone composition comprising:
   (A) 100 parts by weight of a polyorganosiloxane containing at least two silicon-bonded alkenyl groups per molecule and having a viscosity as measured at 25° C. of 10 to 100,000 cP;
   (B) a polyorganohydrogensiloxane containing at least three silicon-bonded hydrogen atoms per molecule in an amount such that the number of silicon-bonded hydrogen atoms contained therein is 0.5 to 4.0 per alkenyl group contained in component (A);
   (C) a catalyst selected from the group consisting of platinum and platinum compounds, in an amount of 0.1 to 100 ppm by weight, in terms of the amount of platinum atoms, based on the amount of component (A);
   (D) 100 to 800 parts by weight of a heat transfer filler having an average particle diameter of 5 to 20 μm and having a particle size distribution such that particles having a particle diameter of 5 μm or less are 20% or more of the whole particles and particles having a particle diameter of 10 μm or more are 20% or more of the whole particles; and
   (E) 0.001 to 10 parts by weight of an adhesion promoter.

2. A thermally-conductive silicone composition as claimed in claim 1, wherein the amount of component (E) is 0.1 to 5 parts by weight.

3. A thermally-conductive silicone composition as claimed in claim 2, wherein the alkenyl group is a vinyl group, an allyl group, a 1-butenyl group or a 1-hexenyl group.

4. A thermally-conductive silicone composition as claimed in claim 2, wherein the viscosity of component (A) is 50 to 10,000 cP.

5. A thermally-conductive silicone composition as claimed in claim 2, wherein the amount of component (B) is such that the number of silicon-bonded hydrogen atoms contained therein is 1.0 to 3.0 per alkenyl group contained in component (A).

6. A thermally-conductive silicone composition as claimed in claim 2, wherein component (D) is particles of a metal, metal oxide or ceramic.

7. A thermally conductive silicone composition as claimed in claim 2, wherein said adhesion promoter is a silane or siloxane derivative having, in the molecule thereof, the following functional groups:
   (1) Si-H bond and epoxy groups;
   (2) Si-H bond and alkoxy groups;
   (3) vinyl group, epoxy group and alkoxy group;
   (4) allyl group and alkoxy group; or
   (5) (meth) acryloxy and alkoxy group.

8. A thermally conductive silicone composition as claimed in claim 7, wherein said adhesion promoter has one of the formula (I) to (VI) below, wherein Me represents a methyl group:

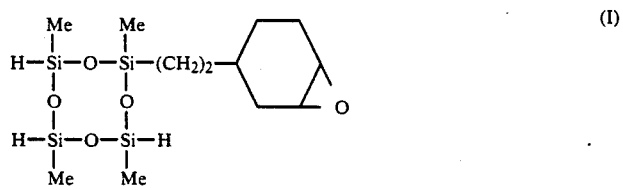

-continued

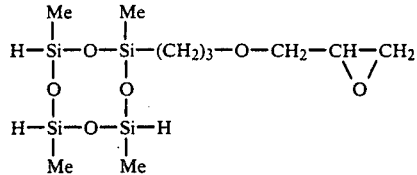 (II)

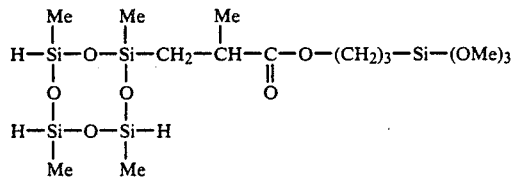 (III)

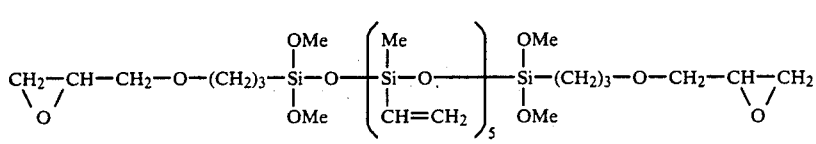 (IV)

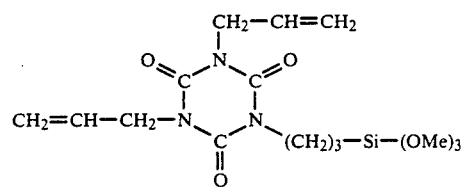 (V)

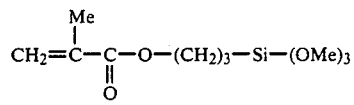 (VI)

Compound (VI) is used in combination with an organic peroxide.)

9. A thermally conductive silicone composition as claimed in claim 7, wherein the amount of the heat transfer filler is 400 to 800 parts of component (A).

10. A thermally conductive silicone composition as claimed in claim 8, wherein the amount of the heat transfer filler is 400 to 800 parts of component (A).

11. A thermally conductive silicone composition as claimed in claim 9, wherein said heat transfer filler is aluminum, copper, nickel, alumina, magnesium oxide, beryllium oxide, chromium oxide, titanium oxide, boron nitride, boron carbide, titanium carbide, silicon carbide or aluminum nitride.

12. A thermally conductive silicone composition as claimed in claim 10, wherein said heat transfer filler is aluminum, copper, nickel, alumina, magnesium oxide, beryllium oxide, chromium oxide, titanium oxide, boron nitride, boron carbide, titanium carbide, silicon carbide or aluminum nitride.

* * * * *